United States Patent
Horvath et al.

(10) Patent No.: US 8,554,925 B2
(45) Date of Patent: Oct. 8, 2013

(54) METHOD AND DEVICE FOR THE BIDIRECTIONAL ADDRESS CONVERSION IN SIP-CONTROLLED DATA STREAMS BETWEEN IPV4 AND IPV6 DATA TERMINALS

(75) Inventors: Ernst Horvath, Vienna (AT); Meinrad Zingerle, Vienna (AT)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 152 days.

(21) Appl. No.: 13/120,270

(22) PCT Filed: Sep. 24, 2009

(86) PCT No.: PCT/EP2009/006914
§ 371 (c)(1),
(2), (4) Date: Apr. 14, 2011

(87) PCT Pub. No.: WO2010/034499
PCT Pub. Date: Apr. 1, 2010

(65) Prior Publication Data
US 2011/0196975 A1    Aug. 11, 2011

(30) Foreign Application Priority Data
Sep. 25, 2008 (DE) .......... 10 2008 048 872

(51) Int. Cl.
*G06F 15/16*    (2006.01)
(52) U.S. Cl.
USPC ............ 709/227; 709/228; 709/245; 709/249
(58) Field of Classification Search
None
See application file for complete search history.

(56) References Cited

U.S. PATENT DOCUMENTS

2006/0015647 A1*  1/2006  Kang et al. .......... 709/245
2008/0276068 A1*  11/2008 Ashraf et al. .......... 712/20

FOREIGN PATENT DOCUMENTS

DE   10 2004 050 572 A1   4/2006
EP   1 515 508 A2   3/2005

OTHER PUBLICATIONS

Tsirtsis et al., "Network Address Translation—Protocol Translation (NAT-PT)" Internet Citation Feb. 1, 2000, XP002167711 Gefunden im Internet: URL:http://www.faqs.org/rfcs/rfc2766.html> [gefunden am May 18, 2001].
International Search Report for PCT/EP2009/006914 dated Mar. 25, 2010 (Form PCT/ISA/210) (German Translation).
International Search Report for PCT/EP2009/006914 dated Mar. 25, 2010 (Form PCT/ISA/210) (English Translation).
Written Opinion of the International Searching Authority for PCT/EP2009/006914 dated Mar. 25, 2010 (Form PCT/ISA/237) (German Translation).
Written Opinion of the International Searching Authority for PCT/EP2009/006914 dated Mar. 25, 2010 (Form PCT/ISA/237) (English Translation).
International Preliminary Report on Patentability for for PCT/EP2009/006914 dated Mar. 29, 2011 (Forms PCT/IB/373, PCT/ISA/237) (German Translation).
International Preliminary Report on Patentability for for PCT/EP2009/006914 dated Mar. 29, 2011 (Forms PCT/IB/373, PCT/ISA/237) (English Translation).

* cited by examiner

*Primary Examiner* — Thomas Dailey
*Assistant Examiner* — Nam Tran
(74) *Attorney, Agent, or Firm* — Buchanan Ingersoll & Rooney PC

(57) ABSTRACT

The invention relates to a method and to a device for the bidirectional address conversion in SIP-controlled data streams between IPv4 data devices (T2) and IPv6 data terminals (T1) in mixed IPv4 and IPv6 data networks using an address converter (AU) and an address converter (AU) integrated in a SIP server (S1 or S2).

20 Claims, 2 Drawing Sheets

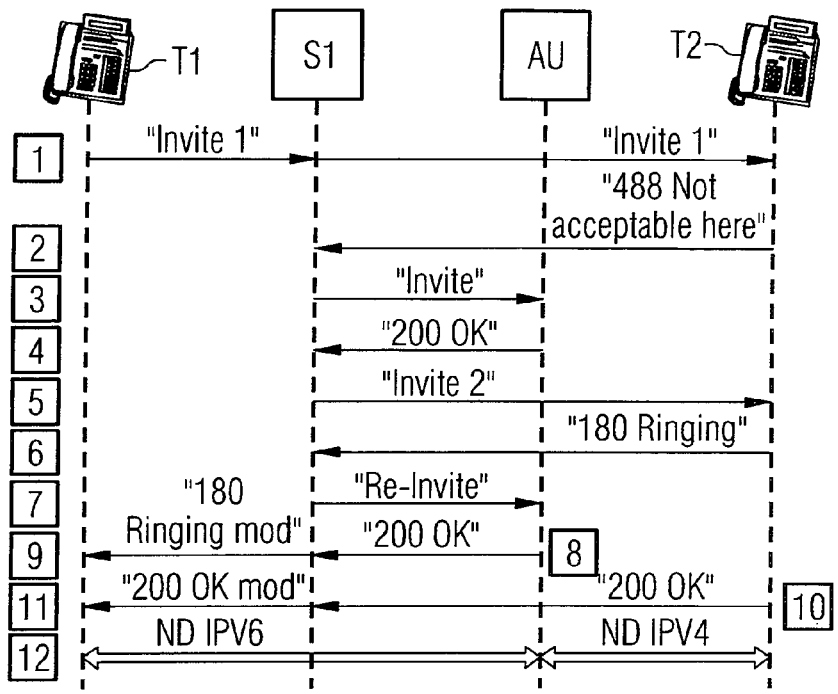
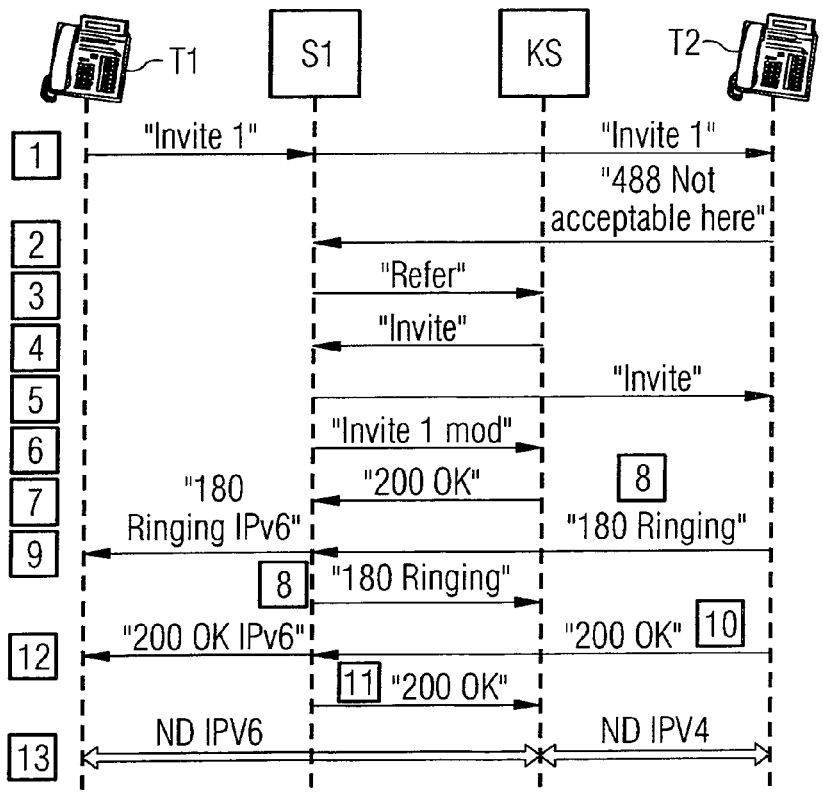

METHOD AND DEVICE FOR THE BIDIRECTIONAL ADDRESS CONVERSION IN SIP-CONTROLLED DATA STREAMS BETWEEN IPV4 AND IPV6 DATA TERMINALS

CROSS-REFERENCE TO RELATED APPLICATIONS

This application is the United States national phase under 35 U.S.C. §371 of PCT International Application No. PCT/EP2009/006914, filed on Sep. 24, 2009, and claiming priority to German Application No. 10 2008 048 872.0, filed Sep. 25, 2008.

BACKGROUND OF THE INVENTION

1. Field of the Invention

Embodiments are in the field of bidirectional address conversion in SIP-controlled data streams between IPv4 and IPv6 data terminals.

2. Background of the Related Art

Telephone systems (Private Automatic Branch Exchange, or PABX) are transmission devices that connect multiple terminals such as telephone, fax, and answering machine to each other and also to the public telephone network. The basic operating element for performing this function is the so-called switching matrix, whose input and output channels are operated by a controller. Telephone systems provide a number of services, such as call forwarding, call transferring, call routing, and conference calls. In addition, certain rights are assigned to each individual terminal device within a telephone system, such as the right to make "outside calls" (for cost control).

Modern telephone systems perform these tasks using IP (Internet Protocol) technology, where the individual terminals are no longer connected to the telephone system with wiring, but rather are connected in a data network like PCs (personal computers). In IP networks, the user data (generally digitized voice data) are assembled in data packets and given a sender address and a target address, and the network infrastructure uses that target address to send the data packet to the terminal.

The IPv4 (Internet Protocol Version 4) normally used for this offers an address space for $2^{32}$ (=4,294,976,296) possible addresses, which today is already almost used up. The further development of IPv4, called IPv6 and intended to resolve this limitation, offers a significantly larger address space for $2^{128}$ potential addresses. IPv6 is standardized in "Internet Protocol, Version 6 Specification; RFC2460 of the IETF (Internet Engineering Task Force). Connecting (partial) networks to the two different Internet protocols (IPv4 and IPv6) generates difficulties which in the SIP environment according to the current state of the art are resolved by the ICE (interactive connectivity establishment) protocol, for which it is necessary that all participating terminals operate according to the ICE protocol and that the user data be forwarded by a central server accessible to all participating terminals. The disadvantage with this is that the ICE protocol must be used in all participating terminals, which may require expensive changes to the control software of every device. EL MALKI, Karim [et al.]: "IPv6-IPv4 Translation mechanism for SIP-based services in Third Generation Partnership Project (3GPP) Networks. Network Working Group", Internet Draft, December 2003, presents a method for bidirectional address conversion in SIP-controlled data streams between IPv6-enabled data terminals and IPv4-enabled data terminals.

BRIEF SUMMARY OF THE INVENTION

The purpose of the invention is to offer a method and a device for improved bidirectional address conversion in SIP-controlled data streams between IPv4 and IPv6 data terminals.

This purpose is achieved by applying a method for bidirectional address conversion in SIP-controlled data streams between IPv4-enabled data terminals and IPv6-enabled data terminals, by means of an address converter and an SIP server and a device for bidirectional address conversion in SIP-controlled data streams between IPv4-enabled data terminals and IPv6-enabled data terminals, by means of an address converter and an SIP server.

The basic principle of the invention is that, by means of interim switching in an address converter, the signaling and data transfers between participating IPv4- and IPv6-enabled terminals are changed such that all participating terminals can only send and receive signaling messages and data packets with a compatible Internet protocol version.

This generates the advantage that a communication network can consist of mixed IPv4 and IPv6 areas, and that in order to permit data transfers across these communication area borders it is necessary to modify only one specific point. This is especially advantageous in telecommunication networks with mixed IPv4 and IPv6 areas, because using this invention allows the central telecommunication server (SIP server), in connection with the central address converter, to make all signaling and data packet modifications, and the individual telecommunication terminals can remain unchanged. This method can be used to particular advantage for the expansion of existing IPv4-enabled telecommunication networks using IPv6-enabled SIP servers and telecommunication terminals.

The main aspect of the solution according to the invention is that, when a connection is initiated from an IPv6-enabled data terminal to an IPv4-enabled data terminal, a specific message is sent indicating the desire to connect, and this message cannot be understood by the IPv4-enabled data terminal, because the IPv6 address contained in the message from the terminal initiating the connection cannot be used by the IPv4-enabled data terminal. According to the invention, the message sent by the IPv4-enabled terminal, indicating an incomprehensible connection initiation request, is intercepted by a server containing an address converter and not delivered to the IPv6-enabled terminal.

In this way, by means of the SIP server and an address converter, it is possible to exchange the signaling messages required to initiate the connection exclusively between the participating IPv6-enabled data terminal and the SIP server, as well as the IPv4-enabled data terminal and the SIP server, so that each data terminal is offered a connection partner with a compatible IP version.

According to the invented method, the connection to an IPv4-enabled data terminal for an IPv6-enabled data terminal is presented in the same way as if it were a connection to an IPv6-enabled data terminal. A connection initiated from an IPv6-enabled data terminal results in the one-time transmission of a message from the IPv4-enabled data terminal refusing the connection request.

The secondary aspect of the solution according to the invention is that, when initiating a connection from an IPv4-enabled data terminal to an IPv6-enabled data terminal, a specific message is sent indicating the desire to connect, and that message cannot be understood by the IPv6-enabled data terminal, because the IPv4 address contained in the message from the terminal initiating the connection cannot be used by the IPv6-enabled data terminal. According to the invention, the message sent by the IPv6-enabled terminal, indicating an incomprehensible connection initiation request, is intercepted by a server containing an address converter and not delivered to the IPv4-enabled terminal.

In this way, in the same manner as for the invented solution according to the main aspect, by means of the SIP server and an address converter, it is possible to exchange the signaling messages required for the connection initiation request exclusively between the participating IPv4-enabled data terminal and the SIP server, as well as the IPv6-enabled data terminal and the SIP server, so that each data terminal is offered a connection partner with a compatible IP version.

According to embodiments of the invented method, the connection initiated from an IPv6-enabled data terminal is presented to an IPv4-enabled data terminal in the same way as if the connection request were from an IPv4-enabled data terminal. A connection initiation request from an IPv4-enabled data terminal results in the one-time transmission of a message from the IPv6-enabled data terminal refusing the connection request.

As part of the signaling during the connection initiation process, according to both the invented solution for the main aspect and the invented solution for the secondary aspect, by means of an address converter, both an IPv4 and an IPv6 address are respectively determined, and these addresses are sent to the respective data terminals as the target addresses for further data transmission.

During data packet transmission, all participating data terminals send data packets to the (compatible) IP addresses provided to them during the signaling process as the connection was being initiated, wherein an address converter receives these data packets, performs the corresponding exchange processes (IPv4 address with IPv6 addresses and vice versa), and sends the data packets to the respective receiving data terminals (located in their respective other IP protocol areas).

Using the invented method it is possible to carry out transparent data transmission between IPv4- and IPv6-enabled data terminals, wherein all participating data terminals need only have SIP compatibility (according to SIP standards RFC 3261, RFC 3515, and RFC 3911).

A conference server such as is often included in SIP-server-based telephone systems has the address conversion means required to do conversions according to the invented method. It is therefore advantageous to use this conference server for converting the target addresses, so that signaling can be adjusted accordingly. This makes it possible to do the bidirectional address conversions in SIP-controlled data streams between IPv4 and IPv6 data terminals at a lower cost.

In one embodiment of the invention, the invented method is applied to the control software of a SIP server on which a telephone system is operated.

In a further embodiment of the invention, the invented method is applied to the control software of an additional (external) server separate from the SIP server.

BRIEF DESCRIPTION OF THE DRAWINGS

The figures show, as examples:
FIG. 3: the principal signaling process according to the invented method.
FIG. 4: the principal signaling process according to the invented method using a conference server.

DETAILED DESCRIPTION OF THE INVENTION

Figure 1:
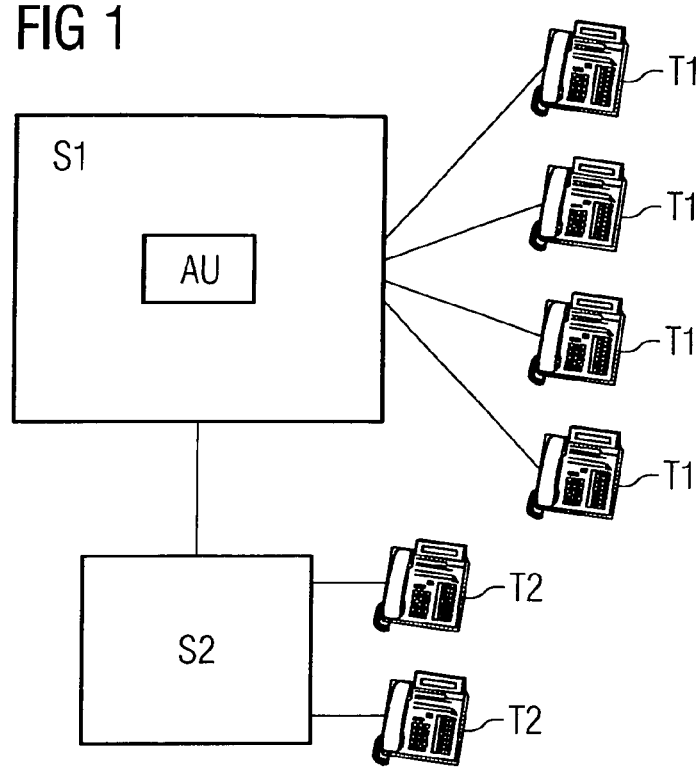
FIG. 1: the principal structure of a communication network with IPv6 and IPv4 portions.

FIG. 1 is a diagram showing an example of the principal structure of a communication network with IPv6 and IPv4 portions. It shows an SIP server S1, which performs the functions of a telephone system, and four terminals T1 connected to that SIP server S1. These terminals T1 use the IPv6 protocol.

An additional SIP server S2 is connected by a data connection to the first SIP server S1. Two terminals T2, which use (only) the IPv4 protocol, are connected to this second SIP server S2. The second SIP server S2 has no functions beyond the normal SIP protocol and serves merely to illustrate that the invention can be used in a networked environment and even in this case only needs to be implemented at one central location; the terminals T2 could instead be connected directly to the SIP server S1.

The first SIP server S1 contains an address converter AU, which converts the bidirectional data streams sent between IPv4-enabled terminals T2 and IPv6-enabled terminals T1. As part of this, the address converter AU modifies the data packets sent out from the participating IPv6-enabled terminals T1 such that these data packets contain a valid piece of IPv4 control information (IP header) and modifies the data packets sent out from the participating IPv4-enabled terminal T2 such that these data packets contain a valid piece of IPv6 control information (IP header). The target address information (IP addresses) required for this is generated during the invented method's steps before user data transmission between the participating terminals and the first SIP server S1 begins (FIG. 3).

Figure 2:
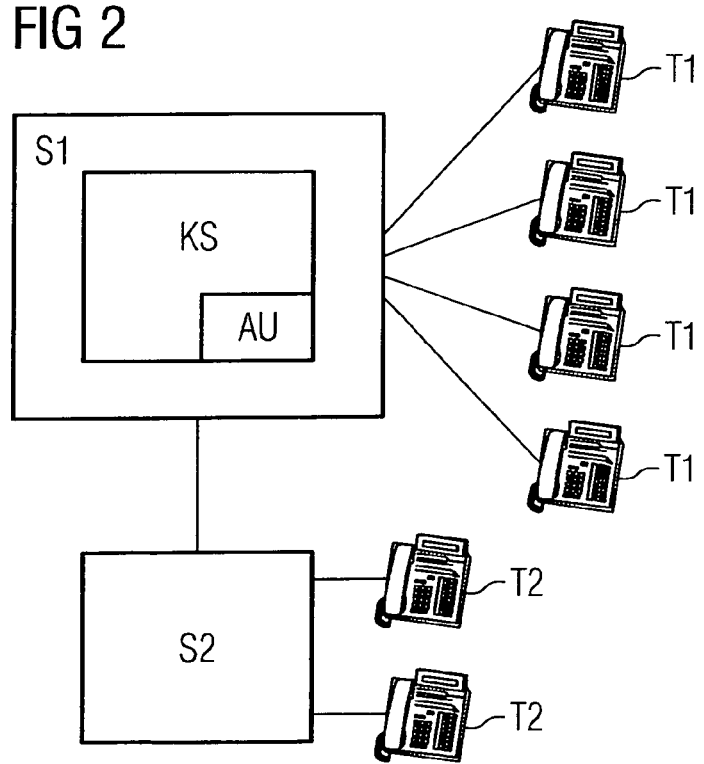
FIG. 2: the principal structure of a communication network with IPv6 and IPv4 portions and a conference server.

FIG. 2 is a diagram showing an example of the principal structure of a communication network with IPv6 and IPv4 portions and a conference server. The structure of the communication network matches that of the example shown in FIG. 1, wherein the address converter AU is integrated into a conference server KS in the first SIP server S1.

FIG. 3 is a diagram showing an example of the principal signaling process using the invented method. It shows the signaling messages, in a communication network according to FIG. 1, that are transmitted between the participating terminals T1, T2 of the SIP server S1 and the address converter AU when data transmission is initiated by an IPv6-enabled terminal T1 to an IPv4-enabled terminal T2. The second SIP server S2 does not make any changes to the messages it forwards, so it is not shown.

The signaling process involves the following steps:
1. An "Invite 1" message is sent from an IPv6-enabled terminal T1 to an IPv4-enabled terminal T2. This "Invite 1" message contains a transmission description (Session Description Protocol, or SDP) and the IPv6 address of the terminal T1, which the IPv4-enabled terminal T2 cannot understand. The SIP server S1 does not modify this "Invite 1" message.
2. A response message of "488 not acceptable here" is sent by the IPv4-enabled terminal T2 in reply to the message that the IPv4-enabled terminal T2 cannot understand. This message is received by the SIP server S1 and is not forwarded to the IPv6-enabled terminal T1.
3. The address converter AU is initialized by means of an "Invite" message that contains the IPv6 address of the IPv6-enabled terminal T1 and the IPv4 address 0.0.0.0.

4. A "200-OK" message confirming successful initialization is sent from the address converter AU to the SIP server S1, containing the IPv6 address of the IPv6-enabled terminal T1 and an IPv4 address generated by the address converter AU.
5. An "Invite 2" message is sent from the SIP server S1 to the IPv4-enabled terminal T2, containing the IPv4 address generated by the address converter AU in the preceding signaling step 4.
6. A "180 ringing" message that confirms the receipt and validity of the received "Invite 2" message is sent from the IPv4-enabled terminal T2 to the SIP server S1, and this message is stored in the SIP server S1.
7. A "Re-Invite" message is sent from the SIP server S1 to the address converter AU, containing a modified transmission description (SDP) that contains the IPv4 address of the IPv4-enabled terminal.
8. A "200-OK" message confirming successful initialization is sent from the address converter AU to the SIP server S1, containing the IPv6 address of the IPv6-enabled terminal T1 and an IPv6 address generated by the address converter AU.
9. The "180 ringing" message stored in the SIP server S1 is modified, wherein the target address of the IPv4-enabled terminal T2 is replaced by the IPv6 address from the address converter AU, and this modified "180 ringing mod" message is delivered to the IPv6-enabled terminal T1.
10. A "200-OK" message confirming successful establishment of the connection is sent from the IPv4-enabled terminal T2 to the SIP server S1, which stores this message.
11. The "200 OK" message received by the SIP server S1 in the preceding signaling step 10 is modified by the SIP server S1, wherein the target address of the IPv4-enabled terminal T2 is replaced by the IPv6 address from the address converter AU, and this modified "200 OK mod" message is delivered to the IPv6-enabled terminal T1.
12. Data transmission using data packets begins between the IPv6-enabled terminal T1 and the IPv4-enabled terminal T2, wherein the address converter AU is entered as the target address for the outgoing data packets from both terminals T1, T2, and the address converter AU makes the corresponding IP Protocol Header exchange, including the source and target addresses of the received data packets, and forwards the data packets to these exchanged target addresses.

FIG. 4 is a diagram showing an example of the principal signaling process using the invented method with the addition of a conference server. It shows the signaling messages, in a communication network according to FIG. 2, that are transmitted between the participating terminals T1, T2, the SIP server S1, and the conference server KS, which includes an address converter AU, when data transmission is initiated by an IPv6-enabled terminal T1 to a IPv4-enabled terminal T2. The second SIP server S2 does not make any changes to the messages it forwards, so it is not shown.

The signaling process involves the following steps:
1. An "Invite 1" message is sent from an IPv6-enabled terminal T1 to an IPv4-enabled terminal T2. This "Invite 1" message contains a transmission description (Session Description Protocol, or SDP) and the IPv6 address of the terminal T1, which the IPv4-enabled terminal T2 cannot understand. The SIP server S1 stores this "Invite 1" message but does not modify it.
2. A response message of "488 not acceptable here" is sent by the IPv4-enabled terminal T2 in reply to the message that the IPv4-enabled terminal T2 cannot understand. This message is received by the SIP server S1 and is not forwarded to the IPv6-enabled terminal T1.
3. A "Refer" message is sent from the SIP server S1 to the conference server KS, containing a transmission description for the desired type of data transmission to an IPv4 address.
4. An "Invite" message is sent from the conference server KS to the SIP server S1, containing a confirmation of the desired data transmission and including the IPv4 address of the conference server.
5. This "Invite" message received by the SIP server S1 in the preceding signaling step 4 is forwarded to the IPv4-enabled terminal T2.
6. An "Invite 1 mod" message is sent from the SIP server S1 to the conference server KS, wherein the "Invite 1" message received by the SIP server S1 in signaling step 1 has a so-called "Join" portion added to it that refers to the "Invite" message from signaling step 4.
7. A "200-OK" message confirming successful initialization of the conference server KS is sent to the SIP server S1, containing the IPv6 address of the conference server KS.
8. A "180 ringing" message that confirms the receipt and validity of the received "Invite 2" message is sent from the IPv4-enabled terminal T2 to the SIP server S1, and this message is stored in the SIP server S1 and forwarded to the conference server KS.
9. A "180 ringing IPv6" message is sent from the SIP server S1 to the IPv6-enabled terminal T1, consisting of the "180 ringing" message from the preceding signaling step 8 and containing the IPv6 address of the conference server.
10. A "200-OK" message confirming successful establishment of the connection is sent from the IPv4-enabled terminal T2 to the SIP server S1, which stores this message.
11. This "200-OK" message received in the preceding signaling step 10 is forwarded by the SIP server S1 to the conference server KS.
12. The "200-OK" message received in signaling step 10 is modified by the SIP server S1 so that it contains the IPv6 address of the conference server, and this "200 OK IPv6" message is forwarded to the IPv6-enabled terminal T1.
13. Data transmission using data packets begins between the IPv6-enabled terminal T1 and the IPv4-enabled terminal T2, wherein the conference server KS is entered as the target address for the outgoing data packets from both terminals T1, T2, and the conference server KS makes the corresponding IP Protocol Header exchange, including the source and target addresses of the received data packets, and forwards the data packets to these exchanged target addresses.

According to a further exemplary embodiment of the invention, similar to the embodiment explained with respect to FIG. 1-4, the connection initiation can be sent by an IPv4-enabled data terminal T2, instead of an IPv6-enabled data terminal T1, to an IPv6-enabled data terminal T1 as a specific message indicating the desire to establish a connection, which cannot be understood by the IPv6-enabled data terminal T1, because the IPv4 address for the data terminal T2 initiating the connection that is contained in that message cannot be used by the IPv6-enabled data terminal T1. According to the invention, the message then sent by the IPv6-enabled data terminal T1, indicating an incomprehensible connection initiation request, is intercepted by the SIP server S1 containing the address converter AU and not delivered to the IPv4-enabled data terminal T2.

In this way, in the same manner as for the invented solution according to the main aspect, by means of the SIP server S2 and an address converter AU assigned to it as in FIG. 1, it is possible to exchange the signaling messages required for the connection request exclusively between the participating IPv4-enabled data terminal and the SIP server, as well as the IPv6-enabled data terminal and the SIP server, so that each data terminal is offered a connection partner with a compatible IP version.

In an embodiment that is a variation of FIG. 1 but not shown, the address converter can also be located in a server that is separate from the SIP server S1.

According to the additional embodiment of the invention (secondary aspect), the connection initiated from an IPv6-enabled data terminal T1 is presented to an IPv4-enabled data terminal T2 in the same way as if the connection were initiated from an IPv4-enabled data terminal T2. A connection initiation request from an IPv4-enabled data terminal T2 results in the one-time transmission of a message from the IPv6-enabled data terminal T1 refusing the connection request.

The invented method of bidirectional address conversion in SIP-controlled data streams between IPv4-enabled data terminals T2 and IPv6-enabled data terminals T1, using an address converter AU and an SIP server S1, involves the following steps according to the additional embodiment of the invention:

The steps in the signaling process required for these steps a) to e) are the same as for the signaling shown in FIGS. 3 and 4, wherein the data transmission is initiated from an IPv4-enabled data terminal.

a) acknowledgement of the initiation of a connection from an IPv4-enabled data terminal T2 as the calling party to an IPv6-enabled data terminal T1 as the called party, by means of a message refusing this connection request from the called IPv6-enabled data terminal T1 through an SIP server S1, b) generation of a respective compatible IPv4 address by the address converter AU as the target address for the connection and transmission of this IPv4 address to the IPv4-enabled data terminal T2 in order to initiate a connection from an IPv6-enabled data terminal T1 to an IPv4-enabled data terminal T2, c) generation of a respective compatible IPv6 address by the address converter AU as the target address for the connection and transmission of this compatible IPv6 address to the IPv6-enabled data terminal T1, d) receipt by the address converter AU of the data packets sent from the data terminals T1 and T2 to these respective target addresses, and e) exchange of the corresponding target addresses in the data packets by the address converter AU and transmission of the data packets to the target addresses of the respective connection partners.

The invented equipment for the additional embodiment of the invention (secondary aspect) for bidirectional address conversion in SIP-controlled data streams between IPv4-enabled data terminals T2 and IPv6-enabled data terminals T1, using an address converter AU and an SIP server S1, involves devices which:

a) in the SIP server S1, for the initiation of a connection from an IPv4-enabled data terminal T2 to an IPv6-enabled data terminal T1, recognize the message sent from the IPv6-enabled data terminal T1 in response to a connection request from an IPv4-enabled data terminal T2, refusing this connection request, b) in the address converter AU, for each of the participating IPv4-enabled data terminals T2, generate a compatible IPv4 address as the target address for the connection and transmit it to the IPv4-enabled data terminal T2, c) in the address converter AU, for each of the participating IPv6-enabled data terminals T1, generate a compatible IPv6 address as the target address for the connection and transmit it to the IPv6-enabled data terminal T1, d) in the address converter AU, receive the data packets sent from the data terminals T1 and T2 to the respective target addresses and make the corresponding exchange of target addresses in the data packets, and e) in the address converter AU, send the data packets to the target addresses of the respective connection partners.

As shown in FIG. 1, the address converter AU is located in the SIP server S1.

In an embodiment that is a variation of FIG. 1 but not shown, the address converter AU can be located in a server that is separate from the SIP server S1.

LIST OF FIGURE REFERENCES

S1 SIP server
S2 second SIP server
AU address converter
T1 IPv6-enabled terminal
T2 IPv4-enabled terminal
KS conference server
ND IPv4 User data with IPv4 target address
ND IPv6 User data with IPv6 target address

The invention claimed is:

1. A method of bidirectional address conversion in Session-Initiated-Protocol ("SIP")-controlled data streams between IPv4-enabled data terminals and IPv6-enabled data terminals, using an address converter and an SIP server, comprising:

an IPv6-enabled data terminal transmitting a first invite message to an IPv4-enabled data terminal to initiate a connection, the IPv6-enabled data terminal being a calling party for the connection being initiated via the first invite message and the IPv4-enabled data terminal being a called party for the connection being initiated via the first invite message;

the IPv4-enabled data terminal transmitting a response message to the IPv6-enabled data terminal in response to receiving the first invite message from the IPv6-enabled data terminal, the response message indicating the first invite message is not acceptable at the Ipv4-enabled data terminal;

the SIP server intercepting the response message, the SIP server foregoing forwarding of the response message to the IPv6-enabled data terminal;

the address converter generating an IPv4 address for the IPv6-enabled data terminal in response to the SIP server intercepting the response message;

the SIP server sending a second invite message to the IPv4-enabled data terminal, the second invite message comprising the generated IPv4 address;

the IPv4-enabled data terminal sending a ringing message to the SIP server, the ringing message confirming receipt and validity of the second invite message by the IPv4-enabled data terminal;

the address converter receiving an IPv4 address of the IPv4-enabled data terminal;

the address converter generating an IPv6 address for the IPv4-enabled data terminal in response to receiving the IPv4 address of the IPv4-enabled data terminal;

the SIP server modifying the ringing message, wherein modifying the ringing message comprises replacing a target address of the IPv4-enabled data terminal in the ringing message with the generated IPv6 address;

the SIP server transmitting the modified ringing message to the IPv6-enabled data terminal;

the IPv4-enabled data terminal sending a confirmation message to the SIP server, the confirmation message confirming successful establishment of the connection;

the SIP server receiving the confirmation message and modifying the confirmation message, wherein modifying the confirmation message comprises replacing a target address of the IPv4-enabled data terminal in the confirmation message with the generated IPv6 address; and the SIP server transmitting the modified confirmation message to the IPv6-enabled data terminal.

2. The method of claim 1, wherein the address converter is located in the SIP server.

3. The method of claim 1, wherein the address converter is located in a server separate from the SIP server.

4. The method of claim 1, wherein the address converter is an address conversion function of a conference server.

5. The method of claim 1, further comprising transmitting data packets between the IPv6-enabled terminal and the IPv4-enabled terminal, the data packets comprising first data packets from the IPv6-enabled terminal and second data packets from the IPv4-enabled terminal, the transmitting of the data packets comprises:

entering the address converter as a target address for the first data packets from the IPv6-enabled terminal;

the address converter receiving the first data packets and making corresponding Protocol Header exchanges to source and target addresses of the first data packets such that the source address identifies the generated IPv4 address for the IPv6-enabled data terminal and the target address identifies the IPv4 address of the IPv4-enabled data terminal;

the address converter forwarding the received first data packets to the exchanged target addresses of the first data packets;

entering the address converter as a target address for the second data packets from the IPv4-enabled terminal;

the address converter receiving the second data packets and making corresponding Protocol Header exchanges to source and target addresses of the second data packets such that the source address identifies the generated IPv6 address for the IPv4-enabled data terminal and the target address identifies the IPv6 address of the IPv6-enabled data terminal; and the address converter forwarding the received second data packets to the exchanged target addresses of the second data packets.

6. The method of claim 1, wherein the address converter generating the IPv4 address for the IPv6-enabled data terminal comprises initializing the address converter based on a third invite message sent by the SIP server to the address converter, the third invite message comprises the IPv6 address of the IPv6-enabled terminal and a predefined IPv4 address, and the address converter sending a second confirmation message to the SIP server, the second confirmation message comprising the IPv6 address of the IPv6-enabled terminal and the IPv4 address generated by the address converter.

7. The method of claim 1, wherein the address converter receiving the IPv4 address of the IPv4-enabled data terminal comprises the SIP server transmitting a re-invite message to the address converter and the address converter receiving the re-invite message, wherein the re-invite message comprises a modified transmission description that contains the IPv4 address of the IPv4-enabled data terminal.

8. The method of claim 7, further comprising initializing the address converter based on the re-invite message sent by the SIP server to the address converter, and wherein the address converter generating the IPv6 address for the IPv4-enabled terminal comprises the address converter transmitting a second confirmation message to the SIP server, the second confirmation message comprising the IPv6 address of the IPv6-enabled terminal and the IPv6 address generated by the address converter.

9. A method of bidirectional address conversion in SIP-controlled data streams between IPv4-enabled data terminals and IPv6-enabled data terminals, using an address converter and an SIP server, comprising:

an IPv4-enabled data terminal transmitting a first invite message to an IPv6-enabled data terminal to initiate a connection from the IPv4-enabled data terminal as a calling party to the IPv6-enabled data terminal as a called party;

the IPv6-enabled data terminal transmitting a response message to the IPv4-enabled data terminal in response to receiving the first invite message from the IPv4-enabled data terminal, the response message indicating the first invite message is not acceptable at the IPv6-enabled data terminal;

the SIP server intercepting the response message, the server foregoing forwarding of the response message to the IPv4-enabled data terminal;

the address converter generating an IPv6 address for the IPv4-enabled data terminal in response to the SIP server intercepting the response message;

the SIP server sending a second invite message to the IPv6-enabled data terminal, the second invite message comprising the generated IPv6 address;

the IPv6-enabled data terminal sending a ringing message to the SIP server, the ringing message confirming receipt and validity of the second invite message by the IPv6-enabled data terminal;

the address converter receiving an IPv6 address of the IPv6-enabled data terminal;

the address converter generating an IPv4 address for the IPv6-enabled data terminal in response to receiving the IPv6 address of the IPv6-enabled data terminal;

the SIP server modifying the ringing message, wherein modifying the ringing message comprises replacing a target address of the IPv6-enabled data terminal in the ringing message with the generated IPv4 address;

the SIP server transmitting the modified ringing message to the IPv4-enabled data terminal;

the IPv6-enabled data terminal sending a confirmation message to the SIP server, the confirmation message confirming successful establishment of the connection;

the SIP server receiving the confirmation message and modifying the confirmation message, wherein modifying the confirmation message comprises replacing a target address of the IPv6-enabled data terminal in the confirmation message with the generated IPv4 address; and the SIP server transmitting the modified confirmation message to the IPv4-enabled data terminal.

10. The method of claim 9, wherein the address converter is located in the SIP server.

11. The method of claim 9, wherein the address converter is located in a server separate from the SIP server.

12. The method of claim 9, wherein the address converter is the address conversion function of a conference server.

13. The method of claim 9, further comprising transmitting data packets between the IPv4-enabled terminal and the IPv6-enabled terminal, the data packets comprising first data packets from the IPv4-enabled terminal and second data packets from the IPv6-enabled terminal, the transmitting of the data packets comprises:

entering the address converter as a target address for the first data packets from the IPv4-enabled terminal;
   the address converter receiving the first data packets and making corresponding Protocol Header exchanges to source and target addresses of the first data packets such that the source address identifies the generated IPv6 address for the IPv4-enabled data terminal and the target address identifies the IPv6 address of the IPv6-enabled data terminal;
   the address converter forwarding the received first data packets to the exchanged target addresses of the first data packets;
   entering the address converter as a target address for the second data packets from the IPv6-enabled terminal;
   the address converter receiving the second data packets and making corresponding Protocol Header exchanges to source and target addresses of the second data packets such that the source address identifies the generated IPv4 address for the IPv6-enabled data terminal and the target address identifies the IPv4 address of the IPv4-enabled data terminal; and
   the address converter forwarding the received second data packets to the exchanged target addresses of the second data packets.

14. The method of claim 9, wherein the address converter generating the IPv6 address for the IPv4-enabled data terminal comprises initializing the address converter based on a third invite message sent by the SIP server to the address converter, the third invite message comprises the IPv4 address of the IPv4-enabled terminal and a predefined IPv6 address, and the address converter sending a second confirmation message to the SIP server, the second confirmation message comprising the IPv4 address of the IPv4-enabled terminal and the IPv6 address generated by the address converter.

15. The method of claim 9, wherein the address converter receiving the IPv6 address of the IPv6-enabled data terminal comprises the SIP server transmitting a re-invite message to the address converter and the address converter receiving the re-invite message, wherein the re-invite message comprises a modified transmission description that contains the IPv6 address of the IPv6-enabled data terminal.

16. The method of claim 15, further comprising initializing the address converter based on the re-invite message sent by the SIP server to the address converter, and wherein the address converter generating the IPv4 address for the IPv6-enabled terminal comprises the address converter transmitting a second confirmation message to the SIP server, the second confirmation message comprising the IPv4 address of the IPv4-enabled terminal and the IPv4 address generated by the address converter.

17. A method of bidirectional address conversion in SIP-controlled data streams between IPv4-enabled data terminals and IPv6-enabled data terminals, using a conference server having an address converter and an SIP server, comprising:

an IPv6-enabled data terminal transmitting a first invite message to an IPv4-enabled data terminal, the first invite message comprising a transmission description and an IPv6 address of the IPv6-enabled data terminal;
   the SIP server receiving and storing the first invite message;
   the IPv4-enabled data terminal transmitting a response message in response to receiving the first invite message from the IPv6-enabled data terminal, the response message indicating the first invite message is not acceptable at the IPv4-enabled data terminal;
   the SIP server intercepting the response message, the SIP server foregoing forwarding of the response message to the IPv6-enabled data terminal;
   the SIP server transmitting a refer message to the conference server, the refer message comprising a transmission description for a desired type of data transmission to an IPv4 address;
   the conference server transmitting a second invite message to the SIP server, the second invite message comprising a confirmation of the transmission description for the desired type of data transmission and an IPv4 address of the conference server;
   the SIP server receiving the second invite message and forwarding the second invite message to the IPv4-enabled data terminal;
   the SIP server transmitting a third invite message to the conference server, the third invite message comprising information from the first invite message and information from the second invite message;
   the conference server transmitting a first confirmation message to the SIP server, the first confirmation message comprising an IPv6 address of the conference server;
   the IPv4-enabled data terminal transmitting a first ringing message to the SIP server, the ringing message confirming receipt and validity of the second invite message by the IPv4-enabled data terminal;
   the SIP server forwarding the first ringing message to the conference server;
   the SIP server transmitting a second ringing message to the IPv6-enabled data terminal, the second ringing message comprising the first ringing message and the IPv6 address of the conference server;
   the IPv4-enabled data terminal transmitting a second confirmation message to the SIP server, the second confirmation message confirming establishment of a connection between the IPv4-enabled data terminal and the conference server;
   the SIP server forwarding the second confirmation message to the conference server;
   the SIP server modifying the second confirmation message such that the modified second confirmation message comprises the IPv6 address of the conference server; and
   the SIP server transmitting the modified second confirmation message to the IPv6-enabled data terminal.

18. The method of claim 17, wherein the conference server is located in the SIP server.

19. A method of bidirectional address conversion in SIP-controlled data streams between IPv4-enabled data terminals and IPv6-enabled data terminals, using a conference server having an address converter and an SIP server, comprising:

an IPv4-enabled data terminal transmitting a first invite message to an IPv6-enabled data terminal, the first invite message comprising a transmission description and an IPv4 address of the IPv4-enabled data terminal;
   the SIP server receiving and storing the first invite message;

the IPv6-enabled data terminal transmitting a response message in response to receiving the first invite message from the IPv4-enabled data terminal, the response message indicating the first invite message is not acceptable at the IPv6-enabled data terminal;

the SIP server intercepting the response message, the SIP server foregoing forwarding of the response message to the IPv4-enabled data terminal;

the SIP server transmitting a refer message to the conference server, the refer message comprising a transmission description for a desired type of data transmission to an IPv6 address;

the conference server transmitting a second invite message to the SIP server, the second invite message comprising a confirmation of the transmission description for the desired type of data transmission and an IPv6 address of the conference server;

the SIP server receiving the second invite message and forwarding the second invite message to the IPv6-enabled data terminal;

the SIP server transmitting a third invite message to the conference server, the third invite message comprising information from the first invite message and information from the second invite message;

the conference server transmitting a first confirmation message to the SIP server, the first confirmation message comprising an IPv4 address of the conference server;

the IPv6-enabled data terminal transmitting a first ringing message to the SIP server, the ringing message confirming receipt and validity of the second invite message by the IPv6-enabled data terminal;

the SIP server forwarding the first ringing message to the conference server;

the SIP server transmitting a second ringing message to the IPv4-enabled data terminal, the second ringing message comprising the first ringing message and the IPv4 address of the conference server;

the IPv6-enabled data terminal transmitting a second confirmation message to the SIP server, the second confirmation message confirming establishment of a connection between the IPv6-enabled data terminal and the conference server;

the SIP server forwarding the second confirmation message to the conference server;

the SIP server modifying the second confirmation message such that the modified second confirmation message comprises the IPv4 address of the conference server; and the SIP server transmitting the modified second confirmation message to the IPv4-enabled data terminal.

20. The method of claim 19, wherein the conference server is located in the SIP server.

* * * * *